United States Patent [19]

Peiffer

[11] Patent Number: 5,294,672

[45] Date of Patent: Mar. 15, 1994

[54] POLYETHYLENE REINFORCED ELASTOMERIC BLEND COMPOSITIONS

[75] Inventor: Dennis G. Peiffer, Annandale, N.J.

[73] Assignee: Exxon Research & Engineering Co., Florham Park, N.J.

[21] Appl. No.: 564,210

[22] Filed: Aug. 8, 1990

[51] Int. Cl.$^5$ .................. C08L 23/08; C08L 33/10; C08L 33/02

[52] U.S. Cl. ........................ 525/227; 525/80; 525/83; 525/196; 525/222; 525/240; 525/919

[58] Field of Search ............. 525/240, 201, 222, 227, 525/196, 919, 240, 227, 80, 83

[56] References Cited

U.S. PATENT DOCUMENTS

| | | | |
|---|---|---|---|
| 3,264,272 | 8/1966 | Rees | 525/329.6 |
| 3,974,240 | 8/1976 | Bock et al. | 525/240 |
| 4,173,669 | 11/1979 | Ashida et al. | 525/360 |
| 4,371,583 | 2/1983 | Nelson | 525/221 |
| 4,379,190 | 4/1983 | Schenck | 525/222 |
| 4,480,061 | 10/1984 | Coughlin et al. | 525/222 |
| 4,480,063 | 10/1984 | Lundberg et al. | 525/185 |
| 4,617,337 | 10/1986 | Lundberg et al. | 525/203 |
| 4,837,272 | 6/1989 | Kelley | 525/59 |

Primary Examiner—James J. Seidleck
Assistant Examiner—W. R. H. Clark
Attorney, Agent, or Firm—Joseph J. Dvorak

[57] ABSTRACT

The present invention relates to thermoplastic reinforced elastomeric blend compositions which exhibit improved tensile strengths, wherein the elastomeric blend compositions comprises a blend of a metal neutralized sulfonated polymer with about 1 to about 40 weight percent of a metal neutralized copolymer of ethylene and methacrylate.

5 Claims, 5 Drawing Sheets 0.5/0.5

0.35/0.65

0.25/0.75

0.15/0.85

0.5/0.5

0.35/0.65

0.25/0.75

0.15/0.85

POLYETHYLENE REINFORCED ELASTOMERIC BLEND COMPOSITIONS

FIELD OF THE INVENTION

The present invention relates to thermoplastic reinforced elastomeric blend compositions which exhibit improved tensile strengths, wherein the elastomeric blend compositions comprises a blend of a metal neutralized sulfonated polymer with about 1 to about 40 weight percent of a metal neutralized copolymer of methacrylate and ethylene.

BACKGROUND OF THE INVENTION

Over the past several decades, polymer blend technology has achieved an important position in the field of polymer science from both a scientific and technology viewpoint. With regard to binary component blends, a large number of possibilities exist in which either miscibility or immiscibility is observed. Superimposed on these myriad of possibilities is the likelihood that one or both of the components are crystalline.

Typically, blends with crystallizable components are generally heterogeneous below the melting temperature. In fact, it has been noted compatible blends within these systems would require the formation of mixed crystals in which both polymer chains would cocrystallize. Therefore, if miscibility would occur, it would occur in the amorphous phases since cocrystallization is an unlikely occurrence.

The literature also teaches that tough amorphous-type blends could be formed with the "addition" of low levels of interacting functionalities. Ionic groups, especially transition metal neutralized sulfonate or carboxylate groups, are able to coordinate with a wide variety of bases, such as 4-vinylpyridine, contained within a separate copolymer structure. The initial thrust focussed on the incorporation of rubbery materials into an amorphous, brittle matrix. The physical properties, especially toughness, was dramatically enhanced through these coordination-type interactions. More recently, a similar approach was utilized to enhance the properties of semicrystalline polymers, specially polyethylene. In both of the above mentioned family of blends, interactions between otherwise immiscible components, resulted in markedly improved properties. The level of functionality was typically less than 10 mole percent, which is not sufficient to form completely miscible systems. As anticipated, the nature of the transition metal counterion had a marked influence on the blend properties. Non-transition metal counterions, such as sodium, form blend systems having poor properties closely approximating those found in unfunctionalized, noninteracting blends.

The unblended metal neutralized ionomeric materials previously described also have interesting solution and bulk properties. The incorporation of even very low levels of ionic groups profoundly influences properties through both intra- and inter-molecular associations. It is now virtually indisputable that low order aggregates and clusters exist in some form in the bulk state. The exact nature of the ion-rich regions, however, are still an object of considerable debate. It is certain that in ion-containing polymers with low ion concentration, the ionic groups aggregate as multiple ion pairs which give the polymer properties similar to a crosslinked system. The junction points are due to physical interactions (and not to chemical bonding). Furthermore, a critical concentration is reached where the properties become dominated by ionic clusters or aggregates of multiplets.

In this invention, solution blending was used to prepare semicrystalline blends containing an ionomeric polyethylene, specifically ethylene-methacrylate copolymer, and an amorphous component, specifically metal neutralized sulfonated ethylene-propylene diene rubber. Melt blending was also an effective blending technique. The instant invention details formation of blends through the interaction of ion-containing copolymers. The ionically-associating units are located on otherwise immiscible blend systems. In the blend compositions described here, the ionomeric associations are purely coulombic in nature and not specific interactions as in blends formed through coordination-type complex formation. These blend compositions can be useful in a variety of structural applications, packaging, home or office appliances, automotive parts, medical applications and the like.

SUMMARY OF THE INVENTION

The present invention relates to the preparation, thermal behavior, mechanical properties and morphology of a family of novel elastomeric binary blends each of which contains ionic functionalities. One component of the blend composition is a semicrystalline copolymer, metal neutralized ethylene-methacrylate (M-EMA) and the other component is an elastomeric component, metal neutralized sulfonated ethylene-propylene diene copolymer (M-SEPDM). These polymeric materials contain low levels of ionic groups (<10 mole %) which are capable of coulombically associating together into microphase separated regions. These regions contain nonstoichometric levels of ionic groups. A general characteristic of these blend systems is the mechanical properties and morphology are directly influenced by the specific composition ratio of rubber (ypi 50 wt. %) to semicrystalline component. Blends without associating units on one (or both) of the components have grossy phase separated components and interfacial adhesions that are as weak as indicated by he poor tensile properties. The interrelationship between structure and mechanical properties are discussed in terms of changes in the disappearance of the spherulitic morphology of the M-EMA component with the addition large amounts of the coulombically-associating elastomeric component, M-SEPDM.

GENERAL DESCRIPTION

Figure 1:
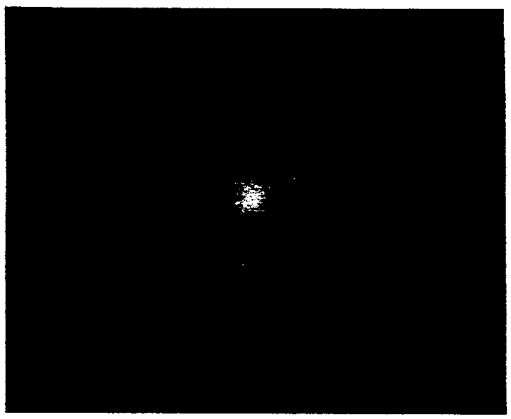
FIG. 1 illustrates Hv light scattering patterns obtained from blends containing various ratios of zinc neutralized ethylene-methacrylate copolymers and Zn-SEPDM.
Figure 1:
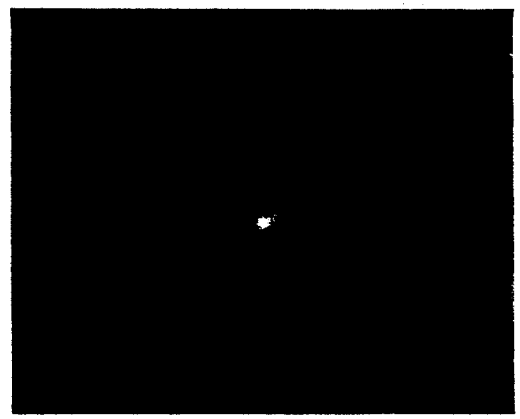
Figure 1:
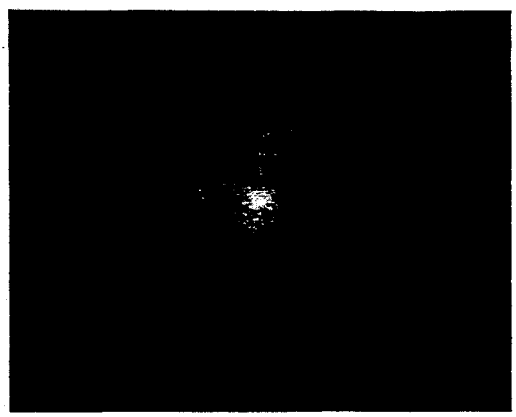
Figure 1:
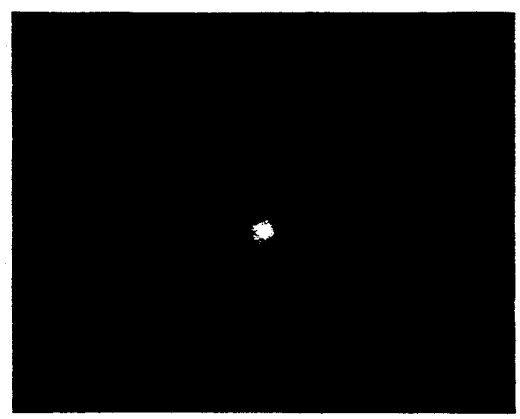

The present invention relates to thermoplastic reinforced elastomeric blend compositions which exhibit improved tensile strengths, wherein the elastomeric blend compositions comprises a blend of a metal neutralized sulfonated polymer with about 1 to about 40 weight percent of a metal neutralized copolymer of ethylene and methacrylate.

The blend compositions of the instant invention can be readily molded into high performance elastomeric articles such as found in packaging, home or office appliances, automotive parts, medical applications and the like. The water insoluble neutralized sulfonated elastomeric polymer comprises from about 4 to about 200 milliequivalents of pendant sulfonate groups per 100 grams of polymer, more preferably from 10 to 100 meq. pendant sulfonated groups. In most instances, the sulfonates utilized in the instant invention are acids or are neutralized with transition elements selected from Groups IVA, VA, VIA, VIIA, VIIIA, IB and IIB of the Periodic Table of Elements and lead, tin and antimony, as well as ammonium and amine counterions. Sulfonated polymers which are subject to the process of the instant invention are illimitable and include both plastic and elastic polymers. Specific polymers include sulfonated styrene, sulfonated polyisobutylene, sulfonated ethylenepropylene terpolymers and sulfonated polyisoprene copolymers (butyl rubber). The preferred sulfonated polymers of the instant invention are ethylene-propylene terpolymers and butyl rubber wherein the ethylene-propylene terpolymers is the most preferred.

Neutralization of the cited polymers with appropriate metal hydroxides, metal acetates, metal oxides, or ammonium hydroxide, etc. can be conducted by means well known in the art. For example, the sulfonation process as with butyl rubber, containing a small (0.3 to 1.0 mole) percent unsaturation, can be conducted in a suitable solvent, such as toluene, with acetyl sulfate as the sulfonated agent, such as described in U.S. Pat. No. 3,836,511, incorporated herein by reference. The resulting sulfonic acid derivative can then be neutralized with a number of different neutralization agents, such as sodium phenolate and similar metal salts. The amount of neutralization agents employed will normally be stoichiometrically equal to the amount of free acid in the polymer, plus any unreacted reagent which is still present. It is preferred that the amount of neutralizing agent be equal to the molar amount of sulfonating agent originally employed plus 10 percent more to ensure full neutralization. The use of an excess of such neutralization agent is necessary to effect at least 50 percent neutralization of the sulfonic acid groups present in the polymer, preferably at least 90 percent, and most preferably essentially complete neutralization of such acid groups.

Thus, the degree of neutralization of said sulfonate groups may vary from 0 (free acid form) to greater than 100 mole percent, preferably 50 to 100 mole percent. With the utilization of neutralized sulfonates in this instant invention, it is preferred that the degree of neutralization be substantially complete, that is, with no substantial free acid present and without substantial excess of the base, other than that needed to ensure neutralization. The neutralized sulfonates possess greater thermal stability compared to their acid form. Thus, it is clear that the polymers which are normally utilized in the instant invention comprise substantially neutralized pendant groups and, in fact, an excess of the neutralizing material may be utilized without defeating the objects of the instant invention.

The sulfonated polymers of the instant invention may be neutralized prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art, i.e., coagulation, steam stripping or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation since in situ neutralization requires preparation of the sulfonic acid in the organic liquid which is to be subjected to the instant process, or the acid form of the sulfonated polymer must be dissolved in said organic liquid. The latter approach may involve handling of an acid form of an ionic polymer which has limited thermal stability. Therefore, it is quite apparent that the preparation and isolation of a neutralized sulfonated polymer affords the maximum latitude in formulation, less problems in handling polymers of limited thermal stability and maximum control over the final mixture of sulfonated polymer, polar cosolvent and organic liquid.

The sulfonated polymers of the instant invention may vary in number average molecular weight from 1,000 to 10,000,000, preferably 5,000 to 1,000,000, most preferably from 10,000 to 600,000. These polymers may be prepared by methods known in the art, for example, see U.S. Pat. No. 3,642,728, hereby incorporated by reference.

The preferred sulfonated polymer for use in the instant invention, e.g., sulfonated ethylene propylene terpolymers, may be prepared by the procedures described in U.S. Pat. No. 3,870,841, filed Oct. 2, 1972, in the names of H. S. Makowski, R. D. Lundberg and G. H. Singhal, hereby incorporated by reference.

The metal neutralized copolymers of ethylene and methacrylate contain about 80 to about 99.9 weight percent of ethylene, more preferably about 90 to about 99.5 weight percent and most preferably about 95 to about 99 weight percent. The carboxylate groups of the copolymer of ethylene and methacrylate are neutralized with a metal ion selected from the group consisting of Groups IA, IB, IIA and IIB of the Periodic Table of Elements, wherein the copolymer of ethylene and methacrylate contains about 0.1 to about 10 mole % of carboxylate groups, more preferably about 1 to about 9, and most preferably about 3 to about 5.

The number average molecular weight of the metal neutralized copolymers of ethylene and methacrylate ranges from about 1,000 to about 10,000,000, more preferably about 5,000 to about 1,000,000, and most preferably about 10,000 to about 600,000.

The elastomeric blend compositions of the metal neutralized sulfonated EPDM terpolymer and the metal neutralized copolymer of ethylene and methacrylate contains about 1 to about 40 weight percent of the copolymer of ethylene and methacrylate, more preferably about 2 to about 35, and most preferably about 5 to about 30. The blend composition can be either formed by solution mixing or hot melt mixing in an extrude, in a Banbury or on a two roll mill. In the case of solution mixing a metal neutralized sulfonated EPDM terpolymer is dissolved in a solution of 95 weight percent xylene and 5 weight percent methanol, wherein the concentration of the metal neutralized sulfonated EPDM terpolymer in the solution is about 1 to about 500 grams/liter. The metal neutralized copolymer of ethylene and methacrylate is dissolved in a solution of 95 weight percent xylene and 5 weight percent methanol, wherein the concentration of the metal neutralized copolymer of ethylene and methacrylate in solution is about 1 to about 500 grams/liter. The solutions of the metal neutralized sulfonated EPDM terpolymer and the metal neutralized copolymer of ethylene and methacrylate are mixed in the appropriate solution volumes to provide the desired weight percents of each component in the final elastomeric blend composition, wherein the elastomeric blend composition is recovered by conventional evaporation procedures of the solvent mixture of xylene and methanol.

DETAILED DESCRIPTION OF THE PREFERRED EMBODIMENT

The following Examples will demonstrate the performance of the elastomeric blend composition of the instant invention.

EXAMPLE 1

The semicrystalline component of the blends were salts of ethylene-methacrylate (EMA), specifically the zinc and sodium salts. Elemental analysis (oxygen) was used to determine the carboxylate content, i.e., ionic content. The nominal carboxylate levels were 4.6 and 2.9 mole percent for the sodium (Na-EMA) and zinc (Zn-EMA) salts, respectively.

The elastomeric component was sulfonated ethylene-propylene-diene polymers (SEPDM) which can be neutralized with a large variety of metal counterions, but in this instance, zinc is preferred. The material is identified as Zn-S-EPDM (TP-319). This material was prepared by sulfonating an EPDM terpolymer of 90,000 weight-average molecular weight which contained 55 weight percent ethylene, 40 weight percent propylene, and 5 weight percent ethylidinenorbornene (ENB). The nominal sulfonation level is 20 meq/100 g of polymer (approx. 0.65 mol %) for TP-319. Neutralization was accomplished with zinc acetate. An excess of neutralization agent was used (200%) in order to insure complete neutralization of all sulfonic acids present. The specific details relating to the sulfonation and neutralization procedures have been described.

The sodium salt was produced in a similar manner except neutralization was effected with the appropriate amount of sodium acetate.

The blends of metal neutralized EMA with metal neutralized SEPDM were prepared by dissolving each component (70° C.) into 95/5 (weight percent) xylene/methanol solution at 10.0 g/dl. Dissolution occurred within 24 hours. The appropriate solution volumes were mixed in order to produce blends spanning a broad composition range. The mixtures were subsequently isolated through evaporation of the solvent mixture. The powders were further dried under vacuum at 120° C.

The powders were formed into final form via compression molding into approximately 2"33 2"×0.02" pads using the following conditions: 2 minute preheat at 350° F., followed by 3 minute press cycle at 29 tons (350° F.) and finally 4 minute cooling to room temperature (again at 29 tons pressure). The appropriate size sample for the tensile testing measurements are cut from these pads.

EXAMPLE 2

The unassociating blend analogs, i.e., one component without interacting groups, were formed with unfunctionalized EPDM (Socabu 55) and the metal neutralized polyethylene derivatives. These blends were prepared via the previously described solution blending of the two individual components and subsequent compression molding. Pads could not be formed with greater than 50 weight percent EPDM due to the very gummy characteristics of these particular blends.

EXAMPLE 3

The current body of evidence convincingly shows that the ionic functionalization in semicrystalline ionomers, specifically polyethylene-based copolymers containing low levels of ion-containing monomers, are located in the amorphous regions of the superstructure. The tight crystalline structure is unable to accommodate the relatively large ionic structures. In fact, as more ionic groups are introduced into the chain structure, the lower the degree of crystallinity, i.e., the larger the amorphous character.

Extensive wide angle x-ray scattering (WAXS) performed in this laboratory also shows that the crystalline structure of these polyethylene-based ionomers (Na and Zn salts) is identical to its unfunctionalized precursor. Similar WAXS results were obtained on all blends containing even low levels of the polyethylene ionomer. These x-ray results strongly suggest that the ionic groups in these materials also reside in the amorphous phase and therefore, addition of noncrystallizable, incompatible macromolecules capable of interacting with these ionic groups, will also reside in the amorphous phase with little no effect on the crystal structure of the degree of crystallinity.

EXAMPLE 4

Differential scanning caloriety measurements were made on all the blends produced for this study. An examination of this data clearly confirms that the degree of crystallinity and melting temperature remains invariant. Minor variation is found in the behavior due to the counterion structure. In some aspects these data closely follows the trends observed in semicrystalline blends formed through coordination-type interactions. It is clear that these purely coulombic interactions do not perturb the lamellae structure.

With regard to the purely coulombically interacting systems, the number of associating moieties is nonspecific with regard to stoichiometry and therefore these interactions can be used broadly in blending relatively large quantities of either blend component. A detailed investigation of semicrystalline blends formed via coordination-type bonding confirms that the morphology and physical properties begin to deteriorate rapidly at a stoichiometry greater than 1:1.

EXAMPLE 5

A broader perspective of the blend morphology containing the zinc salt of EMA and Zn-SEPDM is presented in FIG. 1. As compared to the highly demixed nonassociating blends (not shown), this blend shows a significantly finer dispersion of the two blend components. It is noteworthy that the morphology does not become coarse at any composition as compared to blends based on stoichiometrically controlled interactions. It is readily apparent that the ionic microphase separation phenomenon is effective in blending these binary components. Furthermore, it is noted that identical micrographs are formed with Na-EMA/Zn-SEPDM blends.

EXAMPLE 6

In order to qualitatively examine the morphology, SALS measurements were made on each blend composition. The results are shown in FIGS. 2 and 3 in which the $H_v$ SALS patterns were recorded at a constant sample to detector distance.

The $H_v$ made of polarization is vertically polarized incident light and detection of the horizontally polarized scattered light. The theory of light scattering by crystalline polymers using a model approach was originally developed by Stein and coworkers. For a three-dimensional model of an isolated homogeneous anisotropic sphere with its optic axis fixed to the radius of the sphere, i.e., spherulite morphology produces a four-leaf clover pattern ($H_v$ scattering). This model precisely fits the results of unblended polyethylene ionomers. The only significant differences is the influence of counterion structure on spherulitic size which for the Zn (FIG. 2) and Na (FIG. 3) salts are 3.6 and 4.6 microns, respectively.

In all blends reported, the $H_v$ pattern has lobes at 45° to the polarization direction which implies that the optic axis is oriented perpendicular or parallel to the spherulite radius. With regard to these polyethylene-based blends, the former case is anticipated.

Figure 2:
FIG. 2 illustrates $H_v$ light scattering patterns obtained from blends containing various ratios of sodium neutralized ethylene-methacrylate copolymer and Zn-SEPDM.
Figure 2:
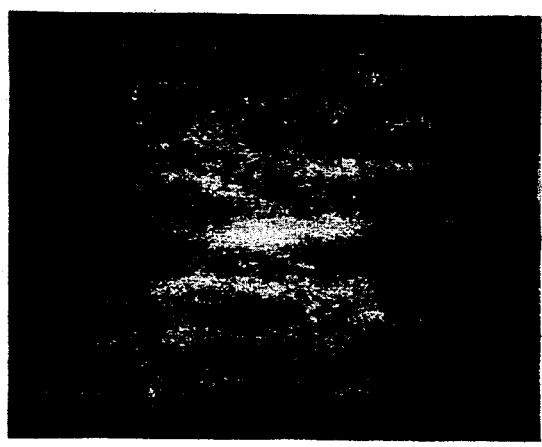
Figure 2:
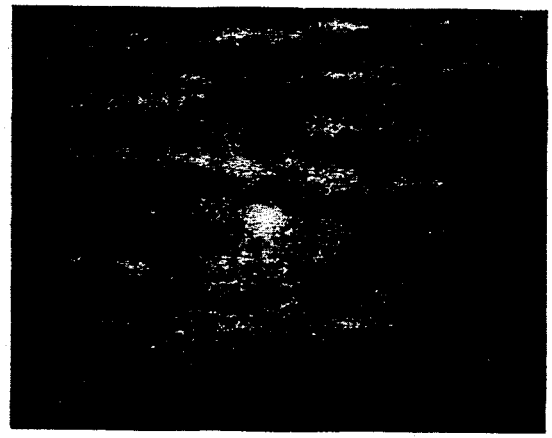
Figure 2:
Figure 3:
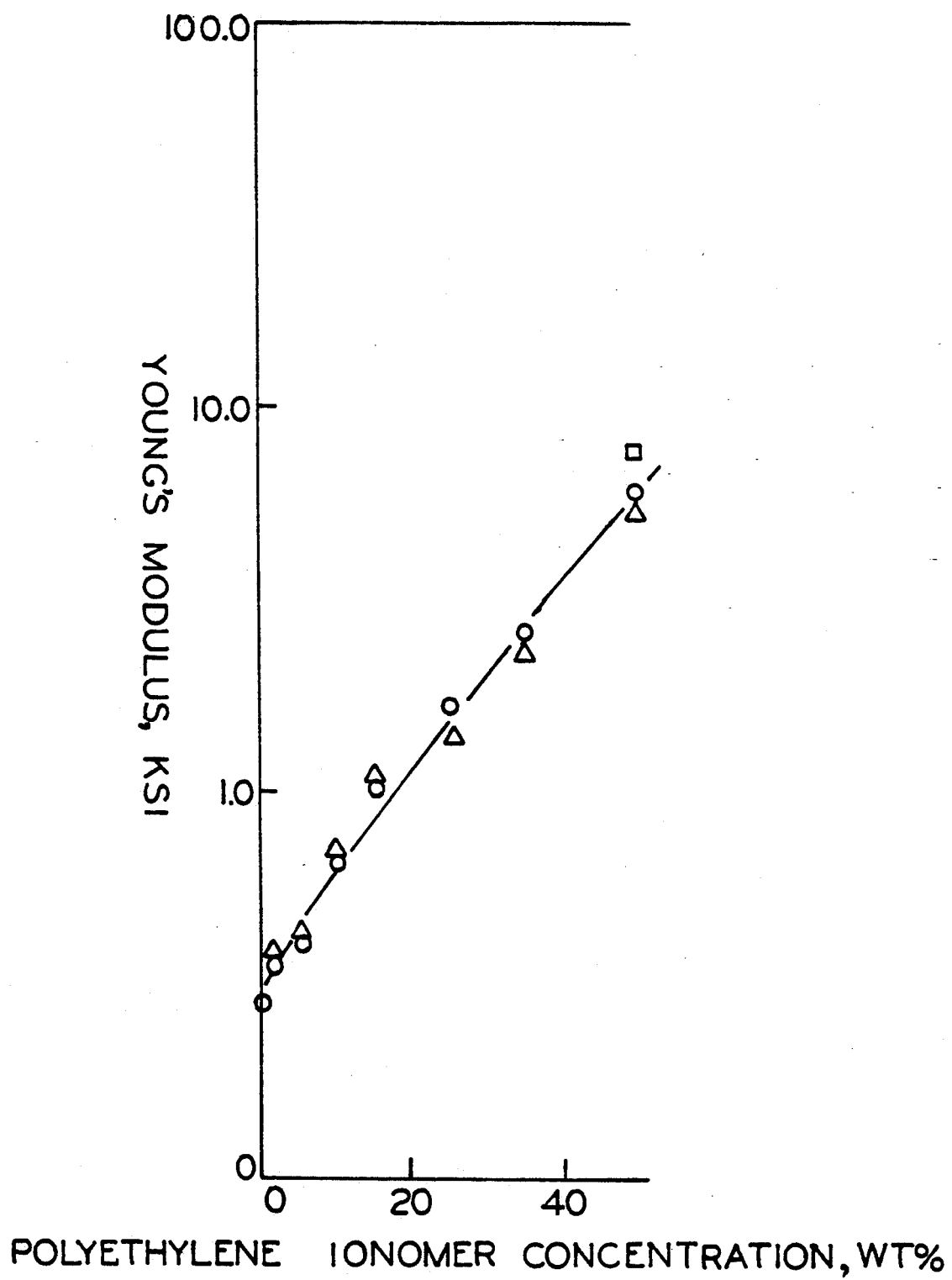
FIG. 3 illustrates youngs modulus as a function of sodium and zinc neutralized ethylene methacrylate copolymer content. ◯ and Δ designates Zn and Na salt respectively.) Zn-SEPDM is the other component of the blend. ☐ denotes the binary mixture of unfunctionalized EPDM with Zn-EMA.

With increasing amount of Zn-SEPDM, the spherulitic size decreases from 4.6 to 1.9 microns for Zn-EMA type blends with the addition of 50 weight percent Zn-SEPDM (FIG. 2). A decrease of 1.5 microns occurs with the initial addition of 25 weight percent Zn-SEPDM. Similar trend is observed in the Na-EMA based blends (FIG. 3).

EXAMPLE 7

Figure 4:
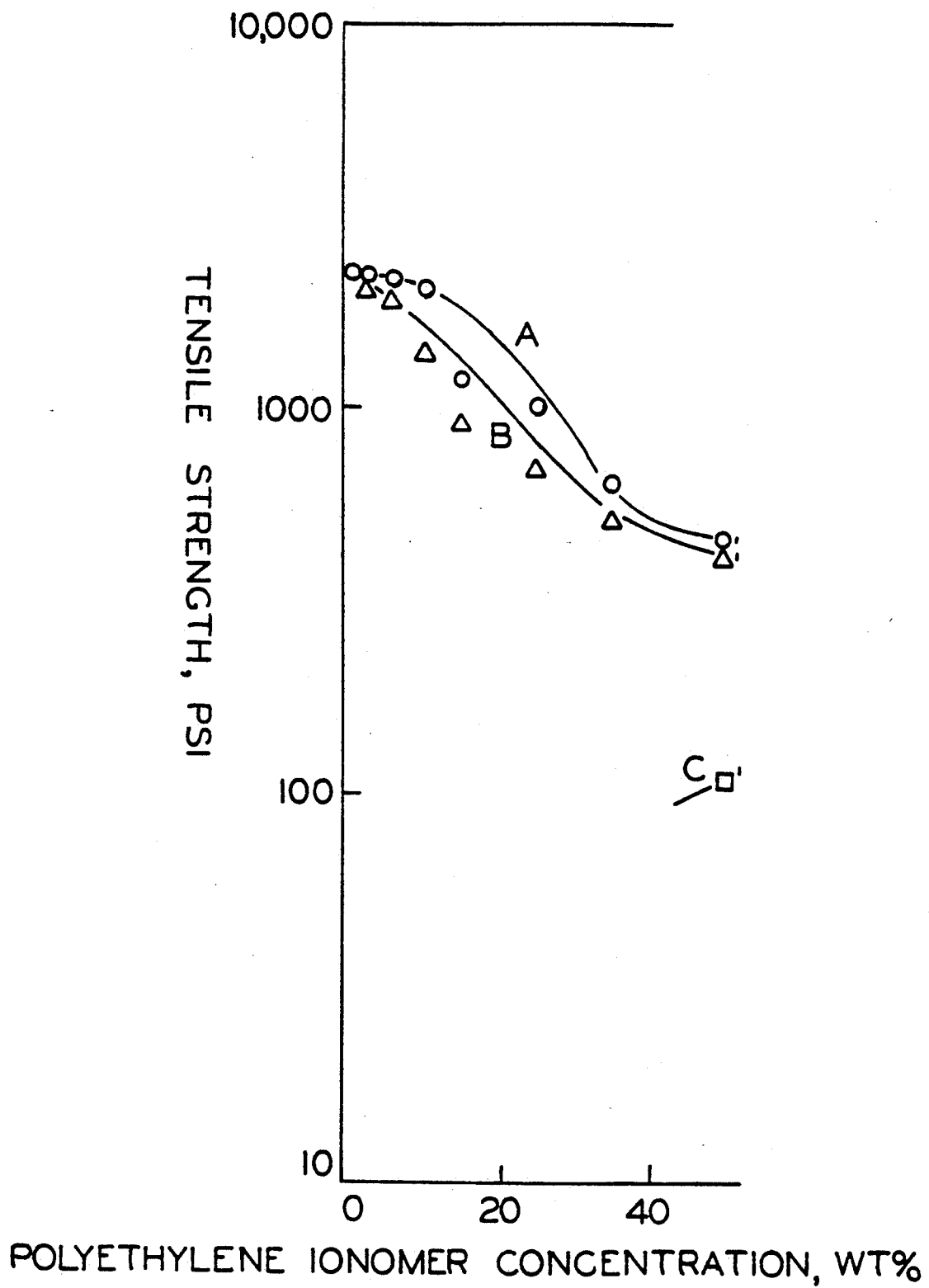
FIG. 4 illustrates tensile strength plotted against sodium and zinc neutralized ethylene-methacrylate copolymer content. (◯ and Δ designates Zn and Na salt respectively.) Zn-SEPDM is the other component of the blend. □ denotes the binary mixture of unfunctionalized EPDM with Zn-EMA.
Figure 5:
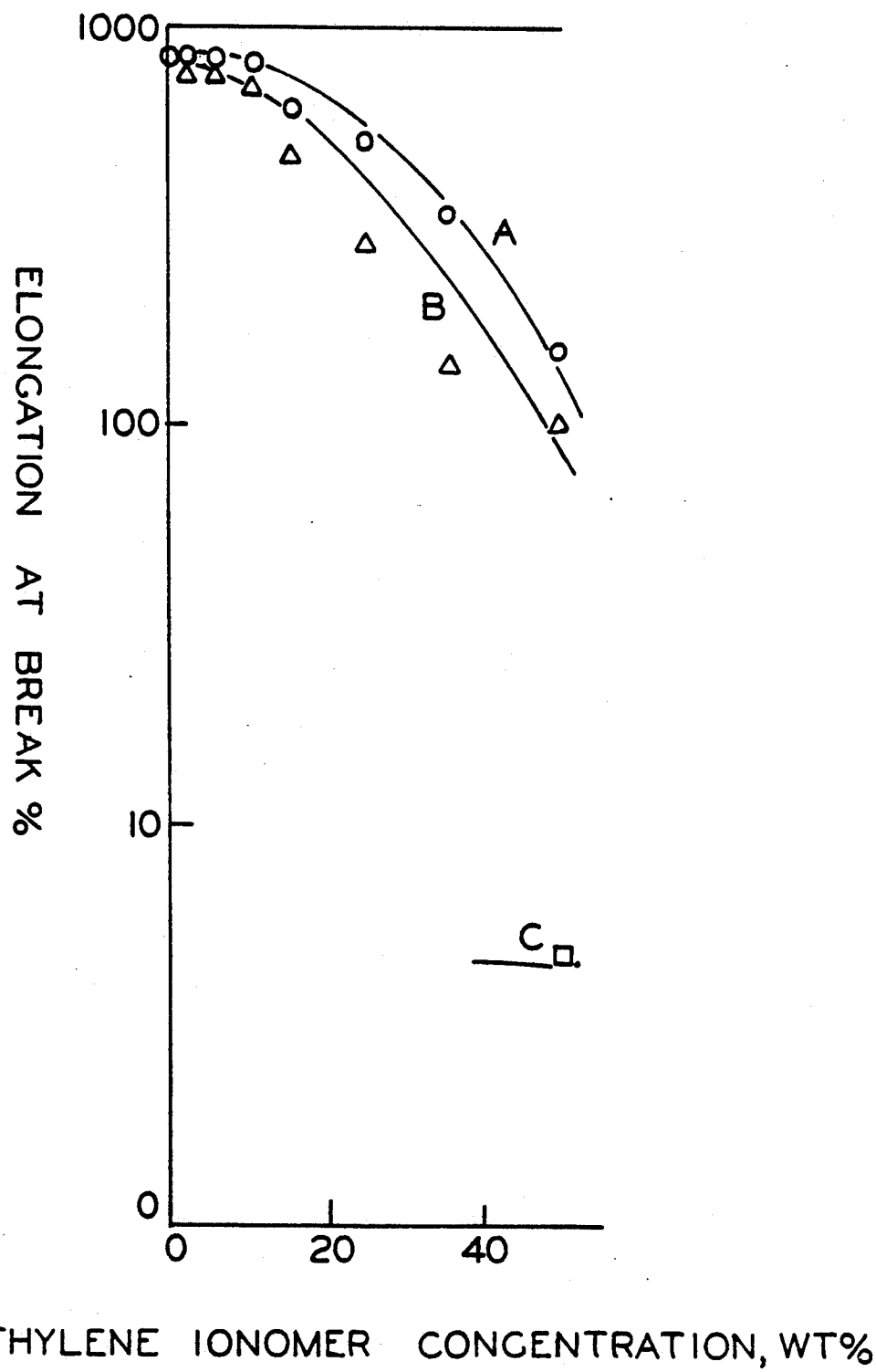
FIG. 5 illustrates elongation at break plotted against sodium and zinc neutralized ethylene-methacrylate copolymer content. (◯ and △ designates Zn and Na salt respectively.) Zn-SEPDM is the other component of the blend. □ denotes the binary mixture of unfunctionalized EPDM with Zn-EMA.

The mechanical properties of these associating polyethylene-EPDM blends are reported in FIGS. 4-6. The modulus-composition relationship for both types of coulombically-associating and their nonassociating analog are shown in FIG. 4. A continuing increase is observed as the polyethylene ionomer component is increased. At approximately 90/10 composition, the modulus remains invariant with composition up to 100/0. It is noteworthy that the spherulite size remains also approximately constant in this composition range. This result can be attributed to the notion that the spherulite integrity is not grossly influenced by the initial modest additions of rubber into the interlamellar space within spherulite itself. The data also shows that the nature of the counterion has a negligible effect.

EXAMPLE 8

Representative tensile strength and elongation at break data are presented in FIGS. 5 and 6. Blends containing either the sodium or zinc salts show substantially enhanced properties as compared to the nonassociating blend. The behavior can be rationalized that the coulombic attractions between the metal neutralized carboxylate and sulfonate groups are of sufficient magnitude to insure good "interfacial adhesion" between the otherwise phase separated components. Poor "interfacial" adhesion results when one component of the blend lacks even low levels of ionic functionality. This factor is certainly reflected in the substantially reduced properties as noted in curve C of FIGS. 5 and 6. Furthermore, the data confirms that, to a first approximation, the blending of increasing levels of the associating elastomeric component reduces the tensile strength and elongation at break by a considerable amount. It is also noteworthy that the initial morphology appears to have an effect on these latter properties.

In summary, a distinguishing characteristic of these blend systems is that in the absence of coulombic-associating groups on either of the chains of these binary mixtures, poor mechanical properties result. If, however, even low levels of ionic functionality are present on both blend components, enhanced mechanical properties are observed over the entire composition range. This is due to the fact that, even though the blends are still immiscible on a gross length scale, good interfacial adhesion occurs through the microphase separation of the ionic units. As compared to somewhat similar blends that interact in a stoichiometric fashion (through transition metal coordination chemistry), these latter microphase phase separated regions can contain a wide number of ionic units. As a result, non-stoichiometric relationships are noted in both the tensile properties and morphology. In fact, the properties are continually modified up to 50 weight percent elastomer content.

What is claimed is:

1. A composition comprising a binary blend of a metal neutralized sulfonated polymer and about 1 to about 40 weight percent of a metal neutralized copolymer of ethylene and methacrylate, the blend of sulfonated polymer and metal neutralized copolymer associating together into microphase separated regions.

2. The composition of claim 1 wherein the metal neutralized sulfonated polymer is an ethylene propylene diene polymer.

3. The composition according to claim 2, wherein said metal neutralized sulfonated polymer has about 4 to about 200 meq. of neutralized sulfonate groups per 100 grams of copolymer which said sulfonated groups are neutralized with a metal ion selected from the group consisting of Groups IVA, VA, VIA, VIIA, VIIIA, IB and IIB of the Periodic Table of Elements and mixtures thereof.

4. The composition according to claim 3, wherein said metal neutralized copolymer of ethylene and methacrylate contains about 0.1 to about 10 mole % of carboxylate groups per 100 grams of said copolymer which said carboxylate groups are neutralized with a metal ion selected from the group consisting of Groups IVA, VA, VIA, VIIA, VIIIA, IB and IIB of the Periodic Tables of Elements and mixtures thereof.

5. The composition according to claim 4, wherein said metal neutralized copolymer of ethylene and methacrylate contains about 80 to about 99.9 weight percent of ethylene.

* * * * *